United States Patent [19]

Polsky

[11] 4,107,988
[45] Aug. 22, 1978

[54] NAVIGATION AID FOR SAILING VESSELS

[76] Inventor: Lawrence M. Polsky, 529 French Rd., Rochester, N.Y. 14618

[21] Appl. No.: 839,061

[22] Filed: Oct. 3, 1977

[51] Int. Cl.² ............................................. G01C 21/10
[52] U.S. Cl. ................................................ 73/178 R
[58] Field of Search ............ 73/178 R; 364/424, 432, 364/443, 447

[56] References Cited

U.S. PATENT DOCUMENTS 3,685,352    8/1972    Pounder et al. .................. 73/178 R

*Primary Examiner*—Donald O. Woodiel
*Attorney, Agent, or Firm*—Martin LuKacher

[57] ABSTRACT

A navigation aid for sailing vessels which provides a continuous indication of the actual progress towards a selected position or goal, such as a course mark in a sailboat or yacht race, is described. The actual progress is indicated in terms of speed made good and/or distance made good so as to enable immediate evaluation of the effect of course changes and variations in vessel performance. The speed of the sailing vessel through the water is detected and an output signal proportional thereto is obtained. A sensor which is responsive to deviations from the direct course to the goal and which may be positioned in azimuth in accordance with that course is also provided. This sensor may be a Hall effect generator which is responsive to the earth's magnetic field as well as to the output signal from the speed detector and provides an output which is proportional to the product of the speed and the cosine of the angle between the course being sailed and the course to the goal. This output is utilized for the continuous indication of the speed made good by the vessel or may be integrated to indicate the distance made good.

13 Claims, 4 Drawing Figures

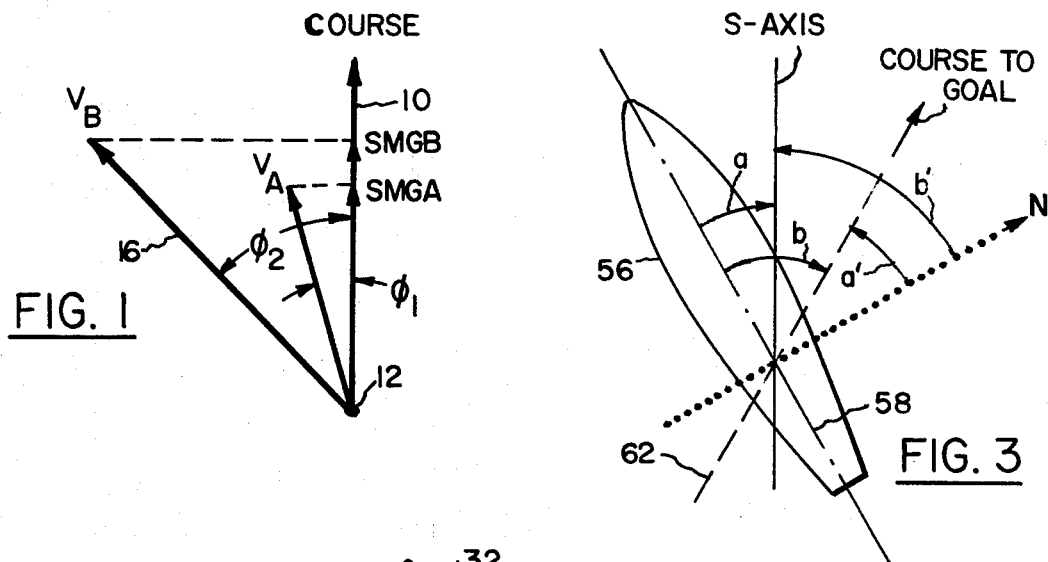
FIG. 1
FIG. 3
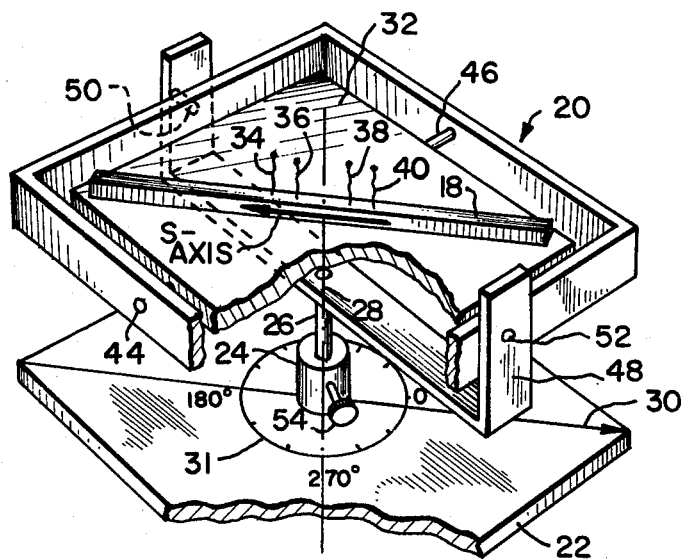
FIG. 2
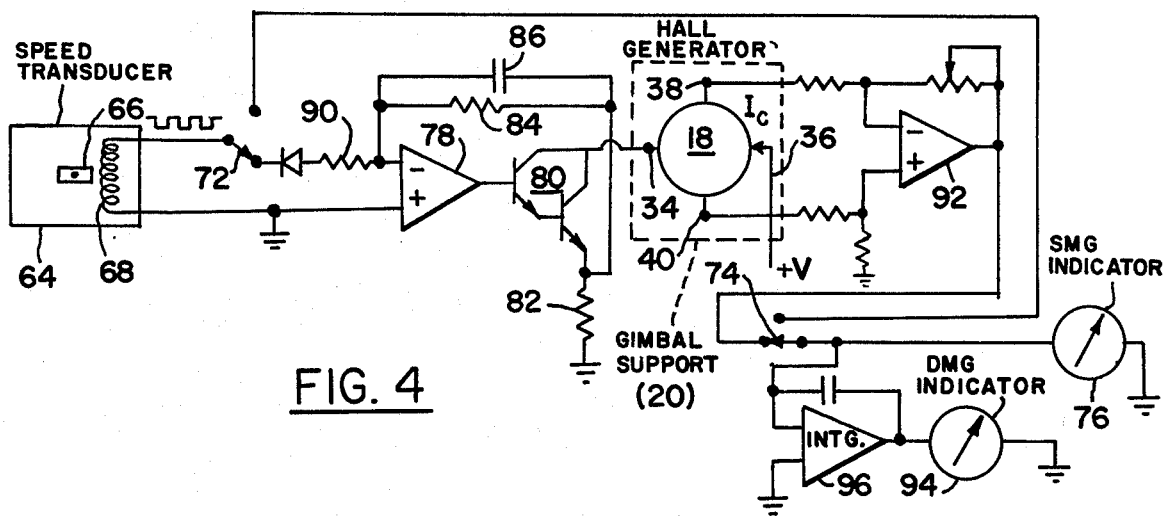
FIG. 4

NAVIGATION AID FOR SAILING VESSELS

The present invention relates to navigation aids for sailing vessels and particularly to a system for the continuous indication of the speed made good and of the distance made good by a sailing vessel as it steers towards a selected position.

In sailing and yacht racing it is desirable to minimize the time required to sail from a given position to some other selected position such as a port or a racing mark. Minimization of the sailing time is accomplished by maximizing the component of speed along the course connecting the vessel's initial position and the selected position. This is most often accomplished by tacking or sailing along a series of courses bracketing the direct course. Tacking is made necessary in that a sailing vessel can not sail closer than a certain angle to the wind. If the direct course lies within that certain angle a sequence of tacks must be performed to reach the selected position. Even where the wind direction is such that the vessel might be able to sail along the direct course, the selected position may in many instances be reached more quickly by tacking, due to the varying performance of a sailing vessel at different angles to the wind. Then the course which is sailed may be longer than the direct course but is sailed at a speed sufficiently higher to more than compensate for the increased sailing distance. The speed along the direct course is termed the "speed made good." The distance traveled along the direct course is, similarly, termed the "distance made good."

Although the speed made good and distance made good may be manually calculated using the speed of the vessel through the water as read from a knot meter, the compass reading and the direct course as inputs, such calculations are not readily available and do not permit prompt course corrections in order to maximize the speed made good and the distance made good.

Accordingly, it is an object of the present invention to provide an improved system for facilitating navigation of sailing vessels by providing continuous indication of speed made good and distance made good.

It is a further object of the present invention to provide an improved system which enables the selection of the fastest route to a selected destination, such as the marks along a yacht racing course, taking account of both the speed and course of the sailing vessel.

It is a still further object of the present invention to provide an improved system for measuring the speed made good of a sailing vessel whereby to provide the helmsman with information for the selection of the point of sail (angle to the wind) for minimum time to reach a selected position (i.e., the best combination of speed and course).

It is a still further object of the present invention to provide a system for automatic and continuous computation and indication of the speed made good and distance made good of a sailing vessel.

It is a still further object of the present invention to provide an improved system for the continuous indication of speed made good and distance made good of a sailing vessel to enable immediate evaluation of heading and sail trim changes by the helmsman of that vessel.

Briefly described, navigation apparatus provided by the invention is operative to indicate the actual progress of a sailing vessel towards a selected position. The apparatus includes means for detecting the speed of the vessel and providing a first output signal proportional thereto. Sensor means responsive to the horizontal component of the earth's magnetic field and therefore to the course steered by the vessel and to the first output signal is rotatable in azimuth to the heading of the direct course to the selected position. The sensor means generates a second output signal as by means of the Hall effect so as to provide a second output which is proportional to the component of the vessel's velocity along the direct course to the selected position. This output may be an output voltage described by the following equation:

$$V_H = K I_C B_H \cos \phi,$$

where $V_H$ is the second output signal; $K$ is a constant; $I_C$ is a current proportional to the first output signal; $B_H$ is the horizontal component of the earth's magnetic field; and $\phi$ is the angle between horizontal component of the earth's magnetic field vector and the sensitive axis (usually the longitudinal axis) of the Hall sensor, which angle is made equal in magnitude to the angle between the direction steered by the vessel and the direct course. This output may be used to drive an indicator which continuously indicates the speed made good and may be integrated and used to drive another indicator which displays the distance made good.

The foregoing objects, features, and advantages of the present invention and a presently preferred embodiment thereof will become more apparent from a reading of the following description in connection with the accompanying drawings in which:

FIG. 1 is a vector diagram showing for explanatory purposes two possible velocity vectors of a sailing vessel to a selected position or destination and illustrating the speed made good of the vessel;

FIG. 2 is a perspective view, partially in section, of a support and azimuth orientation mechanism for the Hall sensor which is used in a system embodying the invention;

FIG. 3 is a vector diagram illustrating the orientation of the Hall sensor to provide for the indication of speed made good and distance made good by the system which embodies the invention; and FIG. 4 is a block diagram illustrating a system for indicating speed made good and distance made good in accordance with a presently preferred embodiment of the invention.

Referring first to FIG. 1, the heading 10 defining a course from the initial position 12 of a sailing vessel to the selected position or goal, may for example be reached by sailing with a velocity vector 14 ($V_A$) or with another velocity vector ($V_B$) shown by the vector 16. The $V_A$ vector 14 is along a course closer to the direct course 10 than the $V_B$ vector 16. As shown in FIG. 4 the magnitude of $V_B$ is larger than that of $V_A$ which is a typical consequence of the varying speed capability of a sailing vessel when sailed at different headings with respect to the wind. The speed made good is the projection of the velocity vector onto the direct course and may be expressed as $$SMG = /V/ \cos \phi$$

where $\phi$ is the angle between the sailing course and the direct course and $/V/$ is the magnitude of the velocity of the vessel.

The speed made good, SMG, is the component of speed along the direct course. As shown in FIG. 1, the angle between $V_B$ and the direct course, $\phi_2$ is much larger than the angle between $V_A$ and the direct course, $\phi_1$. By sailing the course defined by $V_B$ the vessel sails a longer distance than it does while sailing the course defined by $V_A$. However, the speed made good by sailing the course defined by $V_B$ which is shown as SMGB is greater than the speed made good by sailing the $V_A$ course (SMGA). The vessel therefore has a larger component of speed along the course to the goal by sailing with $V_B$ than if it sailed with $V_A$. It is a feature of the invention to provide a continuous indication or readout of SMG thereby permitting immediate evaluation of the effects of course changes and other variations in vessel performance, such for example as sail trim.

Changes in course or heading of the sailing vessel are sensed by means responsive to the earth's magnetic field and to the heading of the vessel with respect to the direct course to the selected position. A Hall sensor or generator device 18 which is supported so as to be rotatable in azimuth on a support mechanism 20 (see FIG. 2) provides such means.

The support mechanism 20 has a base 22. A post 24 on the base has a central opening in which a shaft 26 is rotatably mounted. The axis 28 of the shaft is perpendicular to the base 22 and to a line 30 which intersects the axis 28. A card 31 on the base 22 may be inscribed in degrees of azimuth with the zero to 180° diameter of the card 31 along the line 30. When the support 20 is mounted in the sailing vessel, the line 30 is arranged parallel to the center line of the vessel and removed from or compensated for the significant influence of magnetic materials.

The shaft 26 and the support mechanism 20 may be rotated in azimuth to a desired setting, which as will be explained hereinafter in connection with FIG. 3, will be the magnetic heading to the selected position or goal.

The Hall generator 18 is mounted on a gimballed platform 32. The sensitive axis of the Hall generator 18 is indicated as the S-axis. The S-axis intersects the axis 28 of the shaft 26, and when the axis 28 is vertical, the platform 32 is perpendicular to the axis 28. The orientation of the generator 18 may, in the interest of reducing the size of the support 20, be along a diagonal of the platform 32 as shown. Other orientations may be used. The longitudinal axis of the Hall generator 18 is the sensitive axis. When the S-axis points toward the magnetic North, the generator will provide an output of maximum magnitude. The generator 18 is a four-terminal device having two input terminals 34 and 36 and two output terminals 38 and 40. Leads connect the terminals 34 to 40 to the Hall generator 18. A suitable Hall generator may be Model BH-850 manufactured by F. W. Bell, Inc., 4949 Freeway Drive East, Columbus, Ohio 43229.

The gimballed platform 32 is mounted in a frame 42 on shafts 44 and 46. The axis of these shafts is perpendicular to the azimuth axis 28 when the axis 28 is vertical. The frame 42 is mounted on a yoke 48 which is attached to the shaft 26 and rotates therewith. The frame 42 is rotatably mounted on the yoke 48 by shafts 50 and 52. The axis of the shafts 50 and 52 is perpendicular to the axis of the shafts 44 and 46 as well as the azimuth axis 28. When the azimuth axis 28 is vertical all of the axes intersect just below the S-axis of the Hall generator 18. The gimballed platform 32 provides horizontal stability for the Hall generator 18. The generator 18 is substantially stable in the horizontal plane. The platform 32 and the frame 42 may be suitably weighted or mounted within a fluid filled chamber to provide stability or damping for the platform 32 in the horizontal plane. Reference may be had to U.S. Pat. No. 3,860,931 issued Jan. 14, 1975, for further information respecting the stabilization of gimballed platforms by weighting.

In order to set the azimuth position of the Hall generator a thumb screw 54 may be loosened and the support 20 rotated such that the angle between the longitudinal S-axis of the generator 18 and the vessel's centerline is set equal in magnitude but opposite in sense to the magnetic heading to the selected position or goal. This heading is indicated by the projection of the generator 18 on the card 31 so that the support 20 need only be rotated the number of degrees which is equal to the heading; these degrees being indicated on the card 31. The screw 54 is then tightened to set the Hall generator 18 at the heading. The coordinate conversion error may if desired be reduced by positioning the sensitive axis of the sensor 18 in the plane of the axis 44–46 and 50–52. For further reduction the card 31 and the azimuth axis may also be mounted in this plane, (e.g. on the platform 32).

FIG. 3 illustrates how the Hall generator 18 is responsive to deviations from the course to the goal when the S-axis thereof is set so that the angle between the S-axis and the longitudinal axis of the vessel 56 which is indicated as the center line 48 thereof in FIG. 3, is equal to the negative of the magnetic heading to the goal. The direction to magnetic North is indicated by the dotted line 60. The direct course to the goal is indicated by the dash line 62. The Hall voltage $V_H$ is proportional to $B_H \cos \phi$, where $\phi$ is the angle between the horizontal component of the earth's magnetic field and the S-axis of the Hall generator. This angle $\phi$ is indicated as $b'$ in FIG. 3. When the S-axis of the Hall generator is positioned in azimuth so that the magnetic heading of the course to the goal, which is angle $a'$ is equal to the angle $a$ between the sensitive axis and the longitudinal axis 58 of the vessel 56, the angle $b'$ will be equal to the angle $b$ between the course to the goal 62 and the longitudinal axis 58 of the vessel. Accordingly, the Hall generator output, which is proportional to $B_H \cos b'$, will vary in accordance with the deviations of the course which the vessel 56 sails from the course 62 to the goal.

Referring to FIG. 4, the Hall generator 18 and its gimbal support 20 is shown diagrammatically. The generator 18 is included in a system which provides a continuous indication of the speed made good and the distance made good. The system includes a speed transducer 64 which is sensitive to the speed of the vessel through the water. This transducer may be part of a knot meter; the U25K knot meter manufactured by Electro Marine Systems, of East Amhurst, N.Y., being suitable. This knot meter produces an output pulse train, the amplitude and frequency of which are proportional to the speed of the vessel through the water. This pulse train may for example be produced by a magnet 66 which rotates as by being attached to a paddle wheel in the water. The field from the magnet 66 cuts a coil 68 to produce the pulse train. The Hall generator 18 receives a driving current which is proportional to the speed of the vessel through the water. Any transducer which provides such an output current or a voltage which may be used to obtain such current will be suitable. With the speed transducer 64, such a current is obtained by means of a low pass filter and amplifier circuit 70. The speed transducer 64 is connected to the circuit 70 through a switch 72. This switch cooperates with another switch 74. When true speed and true distance measurements alone are desired the switches 72 and 74 may be used to connect the output of the transducer to a meter 76 which may be calibrated to read the speed. This meter 76 may contain resistance and capacitance (integrating) circuits for deriving the average value of the pulse train from the transducer 64.

The low pass filter and amplifier circuit 70 includes an operational amplifier 78 and an emitter follower stage 80 of Darlington configuration. Feedback from the emitter resistor 82 of the Darlington 80 is applied to the inverting input of the amplifier 78 through a resistor 84 and capacitor 86 which provides low pass filtering action for the circuit 70. Positive excursions of the output from the transducer 64 are blocked by a diode 88 and the pulses drive the amplifier and filter circuit 70 through a resistor 90. The current $I_C$ drawn (sinked) through the Darlington 80 is proportional to the average or DC value of the pulse train from the transducer 64 due to the filtering action of the amplifier and filter circuits 70. This current passes through the Hall generator 18 between the input terminals 34 and 36 thereof. The Hall generator output voltage is proportional therefore to the product of the speed of the vessel and the deviations from the direct course. The output voltage of the Hall generator is expressed by the equation $$V_H = K I_C B_H \cos b',$$

where $K$ is the constant for the Hall generator 18 which depends on its geometry and other fixed parameters; $I_C$ is the control current provided by the low pass filter and amplifier circuit 70 and is proportional to the speed of the vessel; $B_H$ is the horizontal component of the earth's magnetic field; and $b'$ is the angle between North (the earth's magnetic field vector) and the Hall generator's sensitive axis. By the relationships defined in FIG. 3, the angle $b$ equals the angle $b'$. Therefore, the output voltage of the Hall generator is proportional to speed made good along the course to the goal.

The output voltage is obtained from the output terminals 38 and 40 of the Hall generator 18 and is amplified in operational amplifier stage 92. This output voltage is applied to the meter 76 which serves as the speed made good indicator. Another output indicator 94 which may be a meter similar to the meter 76, provides a continuous indication of the distance made good. The speed made good output from the amplifier 92 is integrated in an integrating operational amplifier stage 96 and applied to the distance made good indicator 94. Digital indication instead of analog indication of the speed made good and distance made good may be provided if desired. By observing the indicators 76 and 94 the helmsman is provided with a continuous indication or readout of speed made good and distance made good. The helmsman may evaluate any course changes and make course corrections accordingly so that the vessel can be sailed to the selected position or destination within minimum time.

From the foregoing description it will be apparent that there has been provided an improved system for aiding navigation of sailing vessels by providing continuous indication and readout of the speed made good and the distance made good by such vessels. A presently preferred embodiment of the invention has been described in order to illustrate the inventive concepts involved. Variations and modifications of the hereindescribed embodiment, within the scope of the invention, will undoubtedly suggest themselves to those skilled in the art. Accordingly the foregoing description should be taken merely as illustrative and not in any limiting sense.

What is claimed is:

1. Navigation apparatus for indicating the actual progress of a sailing vessel towards a selected position, said apparatus comprising
    (a) means for detecting the speed of the vessel and providing a first output signal proportional thereto,
    (b) means responsive to the earth's magnetic field and to said first output signal and rotatable in azimuth for generating a second output signal which is proportional to the actual speed of said vessel along a direct course to said selected position, said generating means comprising a Hall effect generator having a sensitive axis, which when aligned in the direction of the earth's magnetic field maximizes said second output signal, and
    (c) indicating means responsive to said second output signal.

2. The invention as set forth in claim 1 wherein said generating means further comprises means for supporting said Hall effect generation and rotating said generator in azimuth so that its sensitive axis can be aligned at an azimuth angle with respect to an axis extending longitudinally of the vessel which is the same in magnitude as and opposite in sense to the magnetic heading of the direct course.

3. The invention as set forth in claim 2 wherein said longitudinal axis is parallel to the center line of the vessel, and said supporting means is rotatable about a vertical axis.

4. The invention as set forth in claim 3 wherein said supporting means includes means for supporting said Hall generator with its sensitive axis in a horizontal plane.

5. The invention as set forth in claim 4 wherein said supporting means includes a gimbal mounted platform on which said Hall generator is disposed.

6. The invention as set forth in claim 5 wherein said supporting means for said platform includes means defining, with said vertical axis when it is vertical, three mutually perpendicular axes of rotation for said platform, said vertical axis being the azimuth axis, and means for adjusting and setting the position of said platform and said generator sensitive axis in azimuth about said azimuth axis.

7. The invention as set forth in claim 1 wherein said means are provided for applying said first output signal as a control current to said Hall generator for providing, as said second output signal, an output voltage $$V_H = K I_C B_H \cos \phi$$

where $V_H$ is said output voltage, $K$ is a constant, $B_H$ is the magnitude of the horizontal component of the earth's magnetic field in the azimuth direction and $\phi$ is the angle between $B_H$ and the sensitive axis of the Hall generator, said sensitive axis being rotatable so that the angle between the longitudinal axis of the vessel and said sensitive axis is equal in magnitude to the magnetic compass heading of the direct course to the selected position.

8. The invention as set forth in claim 7 wherein said applying means comprises a current amplifier and filter.

9. The invention as set forth in claim 7 wherein said detecting means is a knot meter transducer which outputs a train of pulses the repetition frequency of which is proportional to the speed of said vessel, and said applying means includes filter means for converting said train into said control current the amplitude of which is proportional to the speed of said vessel.

10. The invention as set forth in claim 7 wherein said indicating means includes means responsive to said output voltage for indicating speed made good.

11. The invention as set forth in claim 10 wherein said indicating means is a meter.

12. The invention as set forth in claim 7 wherein said indicating means includes means for integrating said output voltage to provide a further output proportional to distance made good.

13. The invention as set forth in claim 12 including means for indicating said output voltage as speed made good and said integrated output voltage as distance made good.

* * * * *